March 28, 1939.    F. NALLINGER    2,151,865
HEATING DEVICE FOR MOTORCARS
Filed Aug. 20, 1934
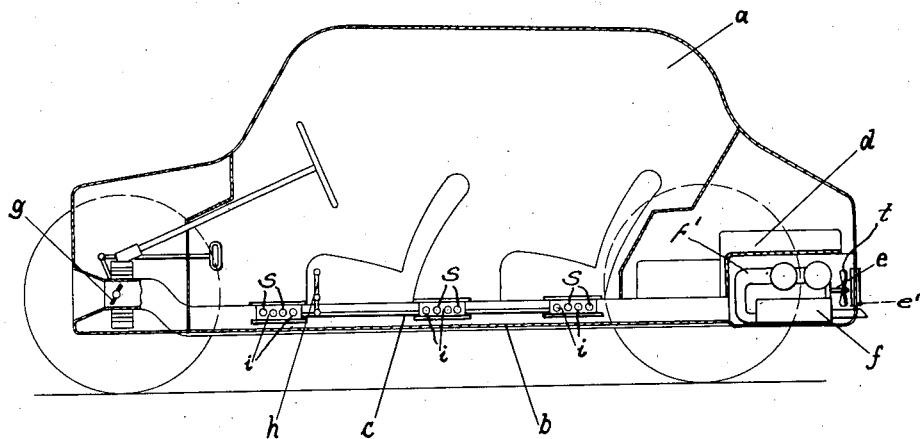
Inventor Patented Mar. 28, 1939

2,151,865

UNITED STATES PATENT OFFICE 2,151,865

HEATING DEVICE FOR MOTORCARS

Fritz Nallinger, Stuttgart, Germany, assignor to Daimler-Benz, Aktiengesellschaft, Stuttgart-Unterturkheim, Germany, a company of Germany Application August 20, 1934, Serial No. 740,656
In Germany July 24, 1933

1 Claim. (Cl. 237—12.3)

The present invention relates to apparatus for heating the passenger or load-carrying compartments of a motor vehicle.

Experience shows that in the case of motor vehicles having closed bodies and with the engine disposed in the rear there is the disadvantage that during cold weather the temperature in the interior of the body is too low to be comfortable owing to the fact that he heat of the engine does not pass into the body as in the case of motor vehicles having the engine in front.

The present invention has for its object to provide means for heating the body of a rear-engined motor vehicle by heat derived from the engine and with this object in view the invention consists in the provision of a conduit extending forwardly from a casing enclosing at least part of the engine, so as to receive in its interior heat given off by the engine, said conduit being in open communication with said casing and having its wall exposed to the air in the interior of the body so as to enable heat from a fluid medium which is passed into the said casing and which receives heat given up by the engine to be given up to the interior of the body. The use of fresh air is of particular advantage since it can be utilised for cooling the engine and may be employed for cooling the radiator in the case of water-cooled engines before being passed into the conduit. Further, the heated air may be passed through openings in the conduit into the body so as to provide a more intense heating of the interior of the body.

In order to reduce the weight and cost of the heating arrangement the conduit is advantageously formed in a part of the vehicle frame or body. In the case of a vehicle having a central hollow longitudinal frame member the latter is formed to act as the conduit for the fluid heating medium and is preferably open at its forward end, so as to enable air at normal temperature to be admitted to the conduit for ventilating the inside of the body, a valve being provided at the forward end of the conduit for controlling the admission of such air.

The conduit for supplying heated air to the body may be utilised for supplying additional cooling air to the engine and radiator, for instance in summer, for which purpose a reversible fan may be provided so that air can either be supplied to the engine or delivered from the engine casing through the conduit to the body.

These and other features of the invention are illustrated in the accompanying drawing, in which The figure is a longitudinal vertical section of a motor vehicle provided with a heating arrangement in accordance with the invention.

Referring to the figure, $a$ is a body of a motor vehicle having a central frame tube $c$ extending in the longitudinal direction of the vehicle with its underside on a level with the floor $b$ of the body. The frame tube $c$ is open at its forward end and at its rear end is in open communication with a chamber $e$ arranged in a housing $d$ at the rear of the vehicle which contains the engine. The chamber $e$ formed in the housing $d$ encloses part of the engine comprising the exhaust manifold $f'$ and the silence $f$ so that its interior receives heat from the engine and more particularly from the exhaust gases. Upon communication is established between the chamber $e$ and the exterior through an aperture $e'$ in the rear end wall of the chamber. Air is admitted to the engine housing $d$ and can be forced into the chamber $e$ through the aperture $e'$ by means of a fan $t$.

At the forward end of the tube $c$ a flap valve $g$ is provided which enables air to pass into the tube from the outside in regulated quantities. The tube $c$ is provided with openings $i$ for establishing communication between it and the interior of the body, the said openings being opened and closed by means of valves $s$. In the figure the openings $i$ are disposed in groups and the valves $s$ for each group are controlled by means of a single hand lever $h$ arranged in proximity to the driver's seat. The fan $t$ is driven by the engine and is mounted to operate in front of the aperture $e'$.

Normally the valve $g$ is open and air is supplied through the tube $c$ for cooling the engine, assisted by the action of the fan if necessary, the valves $s$ being open or closed according to whether or not it is desired to supply ventilating air to the body and the degree of opening of the valve $g$ being adjusted to suit requirements. When it is desired to heat the interior of the body the valve $g$ is closed and the fan $t$ is driven in the reverse direction so that fresh air is drawn into the chamber $e$ and forced into the tube $c$ and through the openings $i$ into the body. The valve $g$ may be opened more or less if the valves $s$ are partially or fully closed, since it is to be understood that it is unnecessary to employ full heating except in very severe weather and in some cases even sufficient heat may be obtained by radiation from the tube $c$.

In the figure the openings $i$ are disposed in groups in front of and behind the driver's seat and behind the rear seat but it will be understood that the openings may be disposed where desired.

I claim:

In a motor car, the combination of a central tubular frame member, a car body and an engine at the rear of the car body, said tubular frame member being in open communication with the car body, of a valve at the front end of the tubular frame member for controlling the admission of fresh air to the body, means for conveying a heating medium past the engine through said tubular frame member for heating the car body and regulating means for controlling the flow of heating medium through the tubular frame member.

FRITZ NALLINGER.